US011258159B2

(12) United States Patent
Timberlake

(10) Patent No.: US 11,258,159 B2
(45) Date of Patent: Feb. 22, 2022

(54) ANTENNA PEDESTAL

(71) Applicant: Garrett L. Timberlake, Virginia Beach, VA (US)

(72) Inventor: Garrett L. Timberlake, Virginia Beach, VA (US)

(73) Assignee: United States of America, as represented by the Secretary of the Navy, Arlington, VA (US)

(*) Notice: Subject to any disclaimer, the term of this patent is extended or adjusted under 35 U.S.C. 154(b) by 81 days.

(21) Appl. No.: 16/853,654

(22) Filed: Apr. 20, 2020

(65) Prior Publication Data

US 2021/0296757 A1 Sep. 23, 2021

Related U.S. Application Data

(60) Provisional application No. 62/991,667, filed on Mar. 19, 2020.

(51) Int. Cl.
*H01Q 1/18* (2006.01)
*B33Y 70/00* (2020.01)
*B33Y 80/00* (2015.01)
*H01Q 1/12* (2006.01)
*C09J 163/00* (2006.01)

(52) U.S. Cl.
CPC .............. *H01Q 1/18* (2013.01); *B33Y 70/00* (2014.12); *B33Y 80/00* (2014.12); *C09J 163/00* (2013.01); *H01Q 1/12* (2013.01)

(58) Field of Classification Search
CPC ...... H01Q 1/12; H01Q 1/1207; H01Q 1/1221; H01Q 1/1228; H01Q 1/1242; H01Q 1/125; H01Q 1/1264; H01Q 1/20; H01Q 1/18

See application file for complete search history.

(56) References Cited

U.S. PATENT DOCUMENTS

| 3,575,512 | A | * | 4/1971 | Baboz | H01Q 1/18 356/138 |
| 4,118,707 | A | * | 10/1978 | Yoshida | H01Q 1/18 33/321 |
| 4,208,662 | A | * | 6/1980 | Horn | H01Q 9/38 343/792 |
| 5,588,369 | A | * | 12/1996 | Rizkalla | F16M 11/125 108/2 |
| 5,769,370 | A | * | 6/1998 | Ashjaee | F16M 11/14 248/168 |

(Continued)

FOREIGN PATENT DOCUMENTS

CN 112928428 A * 6/2021
GB 2568481 A * 5/2019 ............. B63B 79/10

*Primary Examiner* — Ab Salam Alkassim, Jr.
(74) *Attorney, Agent, or Firm* — Gerhard W. Theilman

(57) ABSTRACT

A pedestal is provided for mounting a portable antenna onto a platform. The pedestal includes a ring, a base, a horn and a prong composed of three-dimensionally printable composite resin. The ring attaches to the platform. The base inserts into the ring and includes an outer tube having a pair of axially distributed outer holes. The horn includes an inner tube for insertion into the outer tube and an inverted pyramid that connects to the inner tube. The inner tube includes at least three axially distributed inner holes. The prong has two probes that insert into the outer holes and two of the inner holes to secure the horn to the base.

3 Claims, 5 Drawing Sheets

(56) References Cited

U.S. PATENT DOCUMENTS

| | | | | |
|---|---|---|---|---|
| 5,870,059 A * | 2/1999 | Reynolds | H01Q 1/1242 | 343/760 |
| 6,023,249 A * | 2/2000 | Fujita | H01Q 1/007 | 343/883 |
| 6,111,553 A * | 8/2000 | Steenbuck | H01Q 1/1207 | 343/891 |
| 6,175,339 B1 * | 1/2001 | Macon | H01Q 1/1221 | 343/878 |
| 9,883,147 B1 * | 1/2018 | Zaluski | H04N 7/185 | |
| 2002/0135531 A1 * | 9/2002 | Ehrenberg | H01Q 1/125 | 343/878 |
| 2003/0107525 A1 * | 6/2003 | Ehrenberg | H01Q 1/1235 | 343/881 |
| 2003/0146364 A1 * | 8/2003 | Gates | F16M 11/28 | 248/534 |
| 2005/0250545 A1 * | 11/2005 | Parker | H01Q 1/1207 | 455/562.1 |
| 2008/0278399 A1 * | 11/2008 | Nakajima | H01Q 1/42 | 343/872 |
| 2010/0117914 A1 * | 5/2010 | Feller | H01Q 1/42 | 343/757 |
| 2011/0296908 A1 * | 12/2011 | Kjerstad | H01Q 9/18 | 73/170.29 |
| 2012/0228461 A1 * | 9/2012 | Angseryd | H01Q 1/1242 | 248/513 |
| 2013/0092813 A1 * | 4/2013 | He | H01Q 1/1228 | 248/512 |
| 2017/0082669 A1 * | 3/2017 | Park | H01Q 1/1242 | |
| 2017/0117606 A1 * | 4/2017 | Larson | F16F 15/00 | |
| 2017/0208478 A1 * | 7/2017 | Chaganti | G01S 3/16 | |
| 2017/0331194 A1 * | 11/2017 | Hsu | H01Q 19/106 | |
| 2019/0047484 A1 * | 2/2019 | Kim | B60R 11/00 | |
| 2020/0341113 A1 * | 10/2020 | Shen | G01S 7/4052 | |
| 2021/0265724 A1 * | 8/2021 | Schwartz | H01Q 1/246 | |

* cited by examiner

ANTENNA PEDESTAL

CROSS REFERENCE TO RELATED APPLICATION

Pursuant to 35 U.S.C. § 119, the benefit of priority from provisional application 62/991,667 with a filing date of Mar. 19, 2020, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to antenna pedestals. In particular, the invention relates to support mechanisms for portable antennas without customizing for a particular frequency or expected load while maintaining a minimum distance from the support's platform and minimizing electromagnetic interference.

Portable antennas are used for military personnel for communication purposes. To maintain consistent signal transmission, the antenna's support must minimize electromagnetic interference while avoiding propagation of vibrations from a platform on which the support is mounted.

SUMMARY

Conventional antenna pedestals yield disadvantages addressed by various exemplary embodiments of the present invention. In particular, various exemplary embodiments provide a pedestal for mounting a portable antenna onto a platform. The pedestal includes a base, a horn and a prong composed of three-dimensionally printable composite resin. The base includes an outer tube having a pair of axially distributed outer holes. The horn includes an inner tube for insertion into the outer tube and an inverted pyramid that connects to the inner tube. The inner tube includes at least three axially distributed inner holes. The prong has two probes that insert into the outer holes and two of the inner holes to secure the horn to the base.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and, in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in inches (in or "), mass in pounds-mass ($lb_m$), time in seconds (s), angles in degrees (°) and frequencies in hertz (Hz). Supplemental measures can be derived from these, such as density in grams-per-cubic-centimeters ($lb_m/in^3$), and the like.

Figure 1:
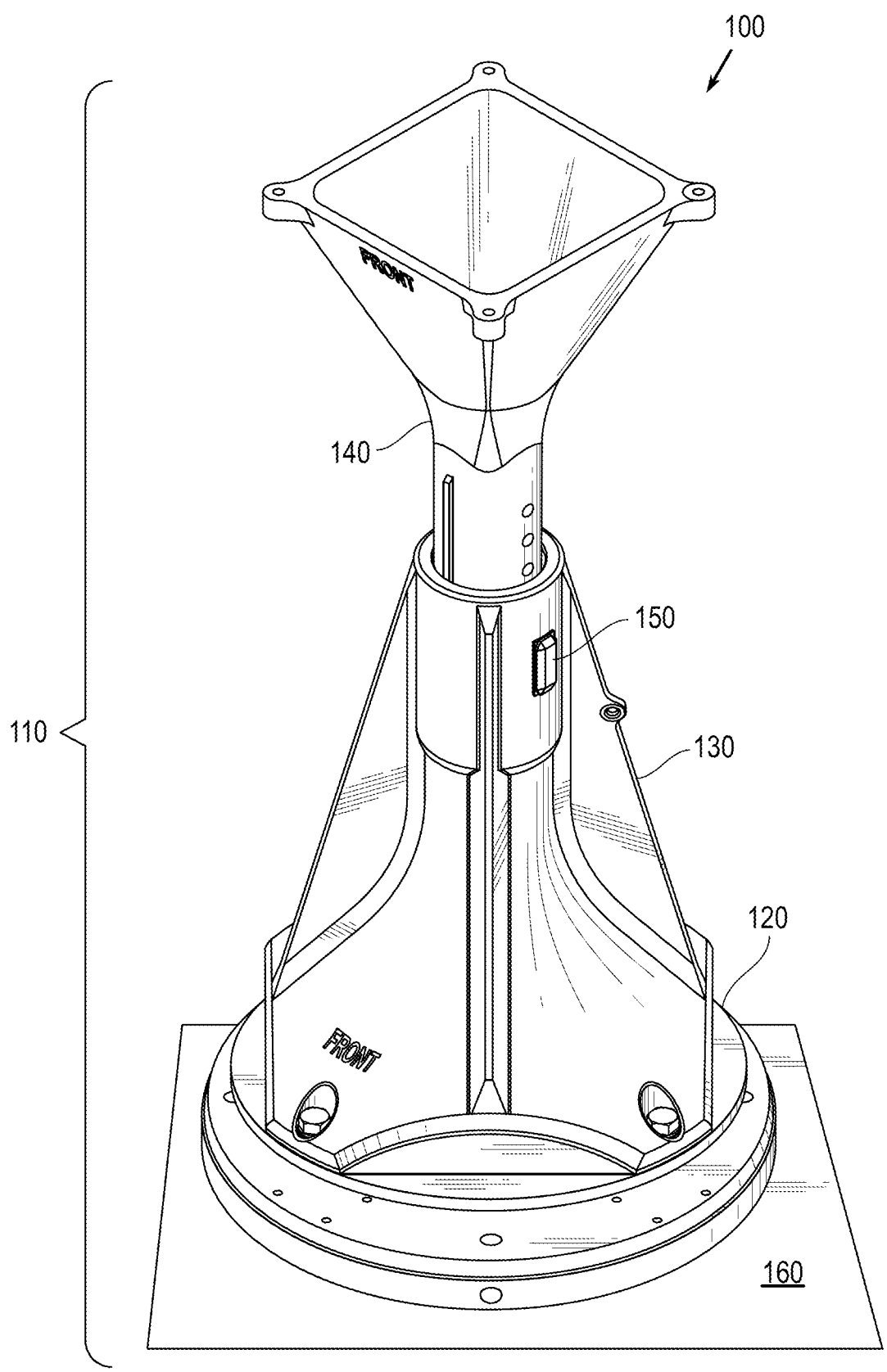
FIG. 1 is an isometric assembly view of an exemplary antenna pedestal.

FIG. 1 shows an isometric assembly view 100 of an exemplary antenna pedestal 110. A circular ring 120 supports the components on an installation platform. A base 130 inserts into the ring 120. A horn 140 inserts into the base 130. A prong 150 secures the base 130 and horn 140 together. The ring 120 attaches to the platform 160 represented as a partial flat surface. The "Front" label denotes the orientation of a directional antenna for insertion into the horn 140.

Exemplary embodiments provide a supportive antenna pedestal 110 that has the capability to withstand a range of unknown resonant excitation frequencies while avoiding interference with expected inbound or outbound radio frequency (RF) emissions. The disclosure describes an antenna pedestal 110 of composite resin for installation on an undefined platform. The primary design requirements include supporting the antenna's load while installed on a moving platform and the pedestal 110 cannot contain any metallic material within 24" of the antenna component. Unknown vibration profiles may pose a risk to the antenna system. The risks to this system could include catastrophic failure of the pedestal 110 and has potential to damage other assets in the immediate area of the pedestal 110 including the antenna as an asset as well as the radome unit housed within.

Measuring and understanding the existing vibration profiles of the platform is critical to the performance of this product. To mitigate the potential for damage, the system has been evaluated using three-dimensional model based finite element analysis (FEA) methods. The first six resonant frequency modes were analyzed, the first three modes fall within the expected maximum ship excitation frequency of 33 Hz. At select resonant frequencies, vibrations can overwhelm the antenna.

To avoid this condition, exemplary embodiments provide a modular pedestal 110 to ensure adequate installation height without excess mass. The exemplary antenna pedestal 110 employs a number of design features to ensure an intuitive installation process to facilitate ease of installation, quality, and durability of the pedestal 110. Example prototypes of the base 130, horn 140 and prong 150 were constructed by additive manufacturing (i.e., three-dimensional printing) from a composite resin called ULTEM™ 9085 (with properties available at http://www.stratasys.com/~/media/files/material-spec-sheets/mds_fdm_ultem9085cert_0618b.pdf) from Stratasys, Ltd. In East Prarie, Minn.

Figure 2:
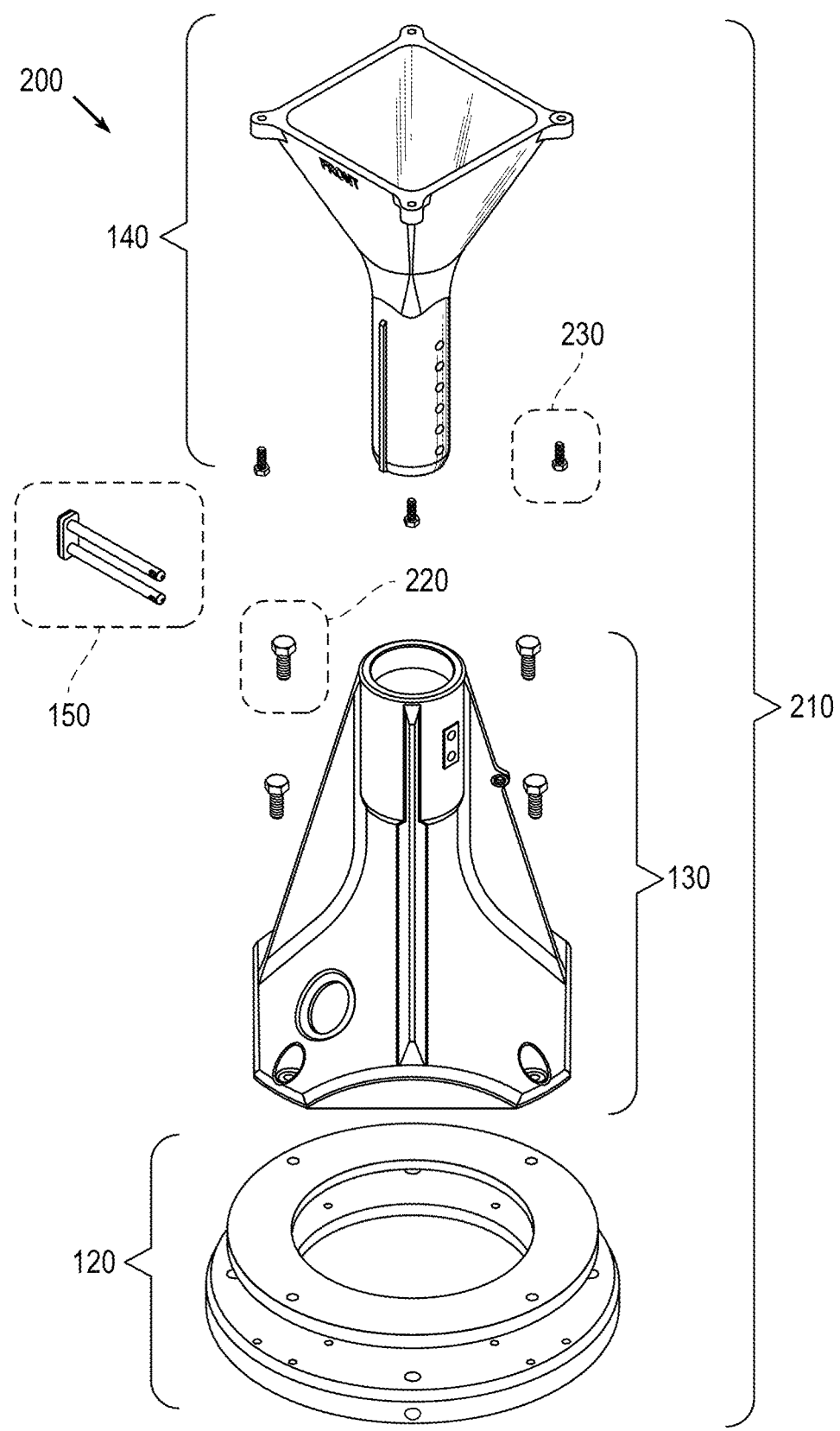
FIG. 2 is an isometric exploded view of components for the antenna pedestal.

FIG. 2 shows an isometric exploded view 200 of components 210 for the antenna pedestal 110. The base 130 is above the ring 120. The horn 120 is above the base 130. The prong 150 is adjacent to the base 130 and the horn 140. Four hex-head bolts 220 fasten the base 130 to the ring 120. Four smaller bolts 230 secure an antenna to the horn 140. The base 130 and the horn 140 can be bonded by Hysol EA 9394 epoxy.

Figure 3:
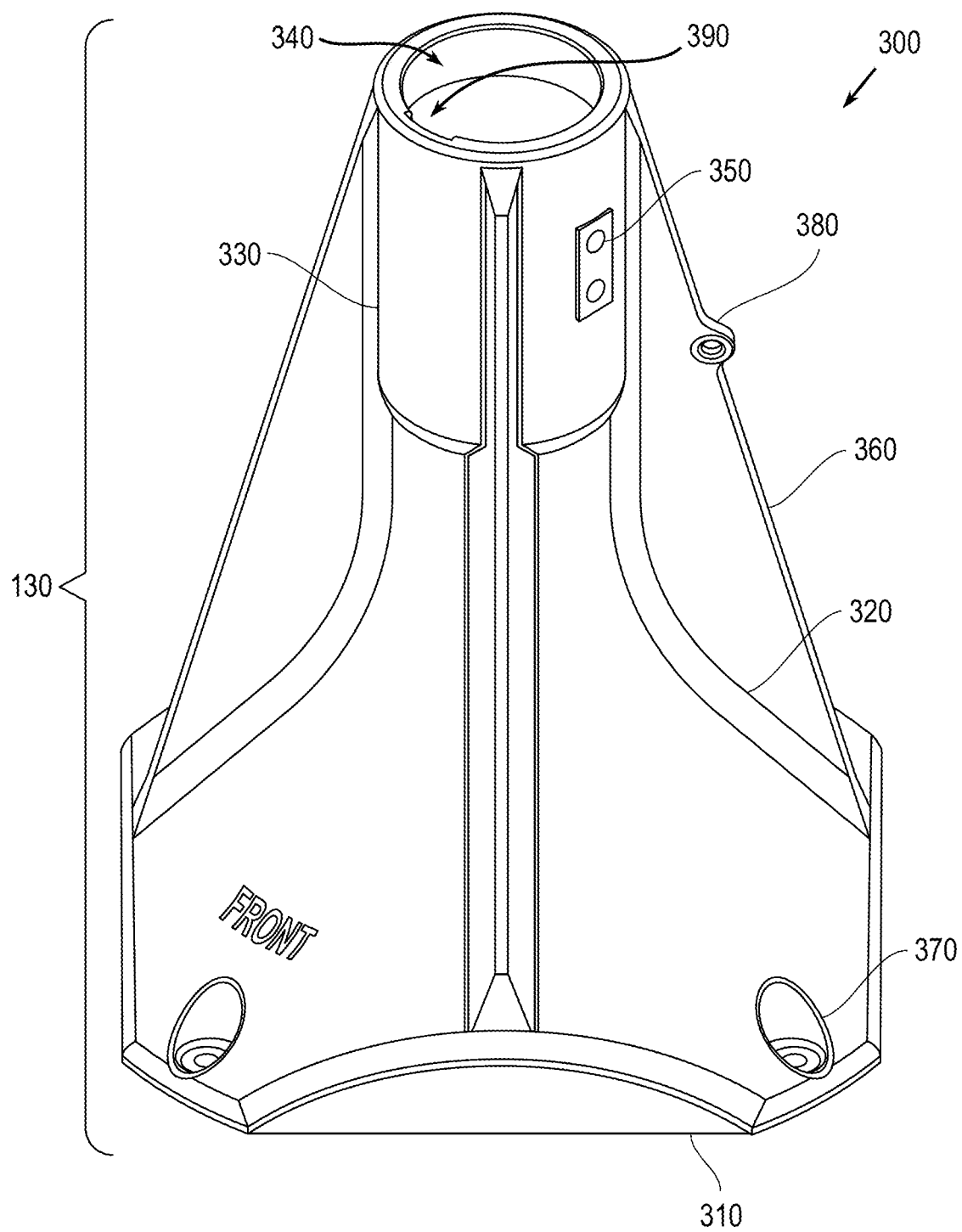
FIG. 3 is an isometric view of a base.

FIG. 3 shows an isometric view 300 of the base 130. A pad 310 fits into the ring 120. A flare column 320 extends above the pad 310. A cylindrical tube 330 extends above the flare column 320 and presents an opening 340. A side landing 350 is disposed along the outer rim of the tube 330. Four chamfered buttresses 360 extend radially from the tube 330. The pad 310 includes four vertical openings 370 for receiving the bolts 220. One of the buttresses 360 includes a grommet 380 for receiving an antenna cable stay. The opening 340 includes a notch 390 for aligning the horn 140 during insertion.

Figure 4:
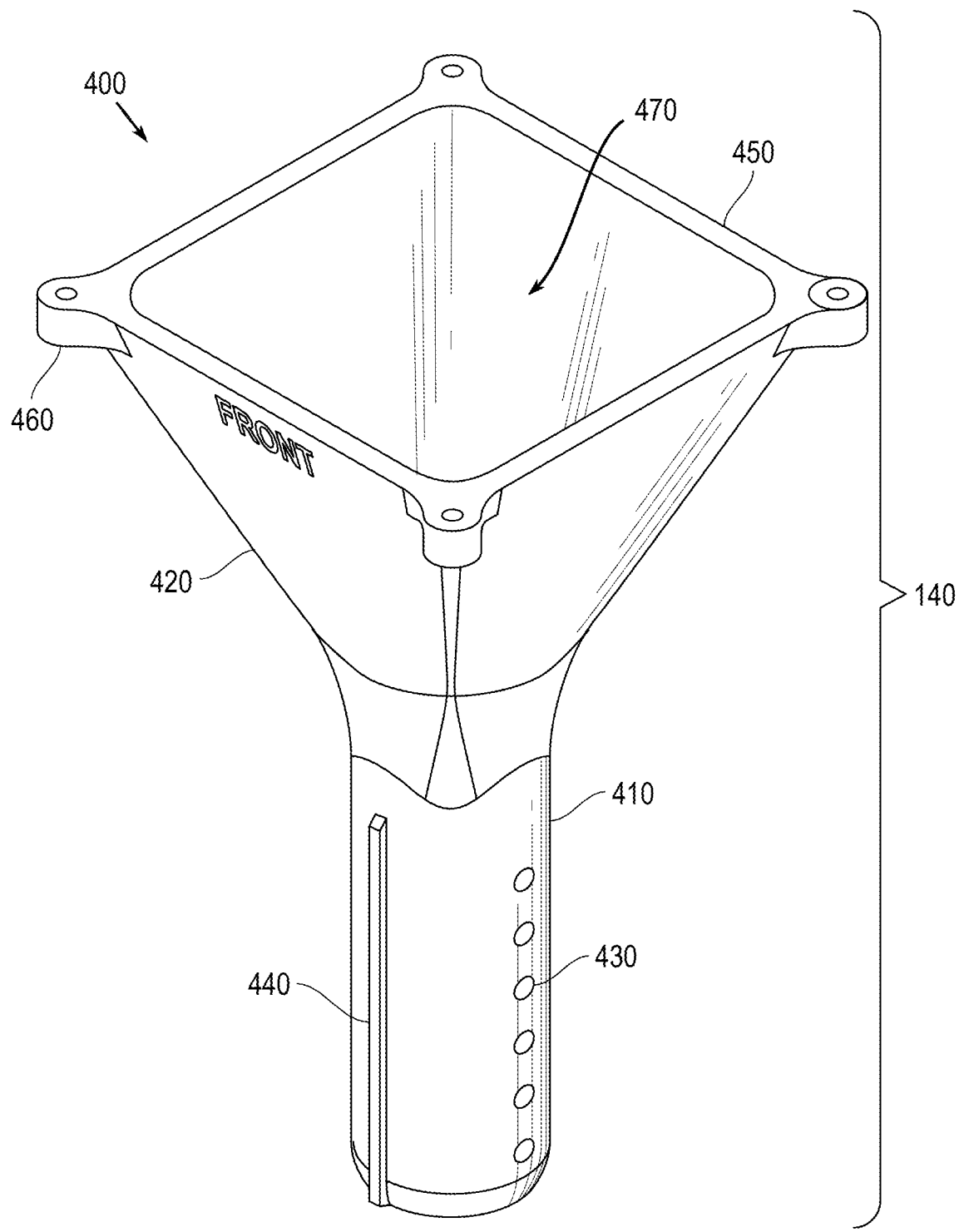
FIG. 4 is an isometric view of a horn.

FIG. 4 shows an isometric view 400 of the horn 140, which comprises a cylindrical tube 410 and an inverted pyramid 420. The tube 410 inserts vertically into the opening 340. The tube 410 includes an axially distributed series of holes 430 along its periphery to receive the prong 150 and an external ridge 440 that extends radially outward and longitudinally along its length to engage the notch 390 for alignment. In this configuration six holes 430 are provided to permit height, adjustment, although as few as three can be envisioned without departing from the scope of the claims.

The pyramid 420 terminates along a square edge 450 with ears 460 at the corners. At its top, the pyramid 420 includes a receptacle 470 to receive an antenna. By providing a series of vertically distributed holes 430 enable height adjustment with the base 130, height distance between the platform and the antenna as measured between the pad 310 and the edge 450 can be adjusted from the minimum of 24", and the resin material of both the horn 140 and the base 130 minimizes electromagnetic interference with the antenna.

Figure 5:
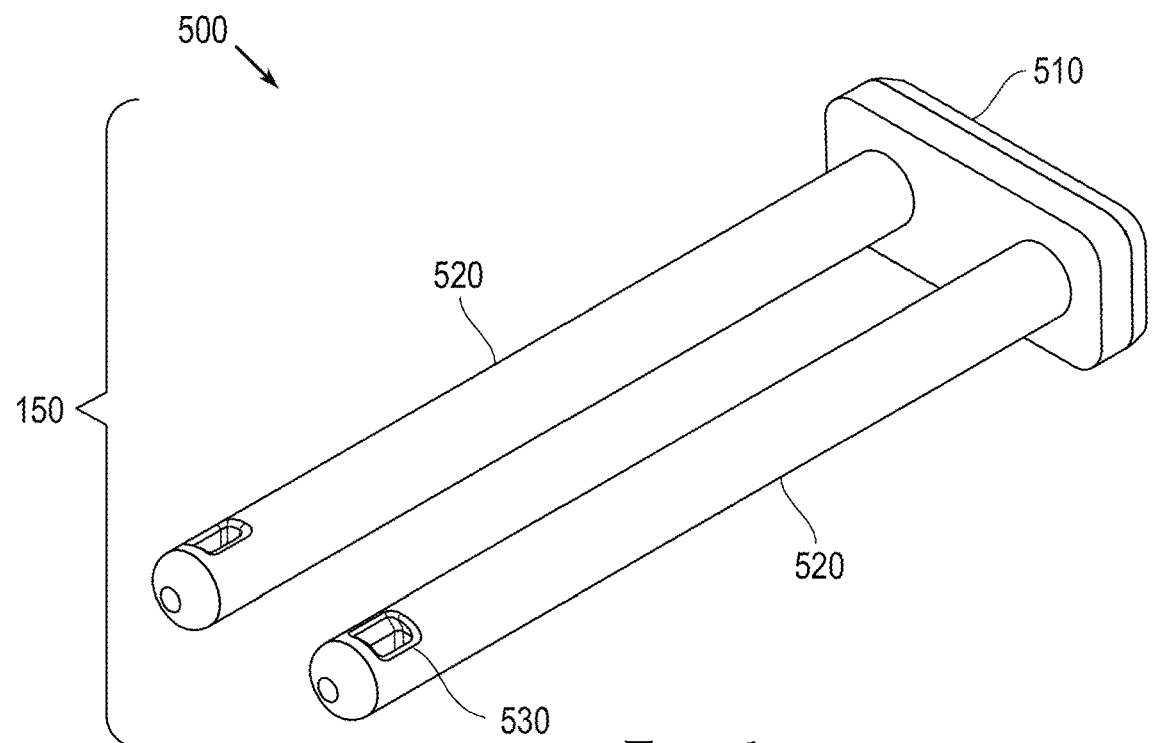
FIG. 5 is an isometric view of a prong.

FIG. 5 shows an isometric view 500 of the prong 150, which includes a flange 510 and a pair of cylindrical probes 520 that extend therefrom. Each probe 520 includes an opening 530 at the distal tip. The probes 520 insert into the landing 350 of the base 130 and two of the holes 430 of the horn 140 to secure the pedestal 110.

Figure 6:
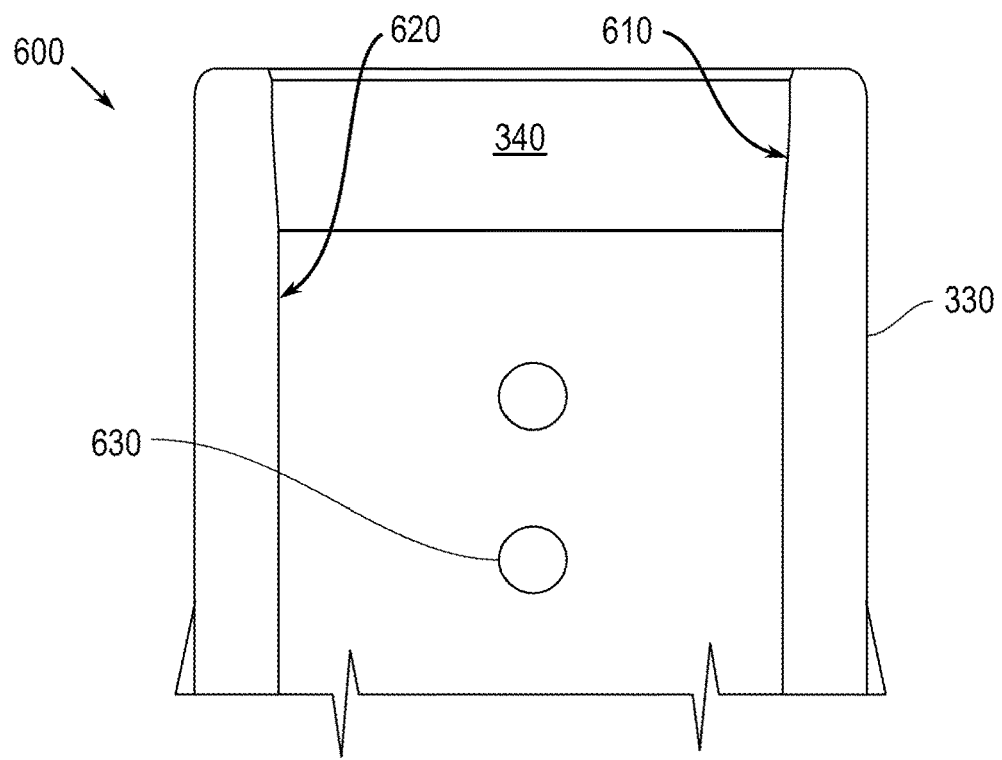
FIG. 6 is an elevation cross-section detail view of the base.

FIG. 6 shows an elevation cross-section view 600 of the base's tube 330. The opening 340 includes a tapered entrance wall 610 and a straight cylindrical channel wall 620. From the interior, a pair of holes 630 penetrates through the tube 330 at the landing 350 to receive the probes 520.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A pedestal for mounting a portable antenna onto a platform, said pedestal comprising:
    a ring for engaging the platform;
    a base for inserting into said ring, said base including an outer tube having a pair of axially distributed outer holes;
    a horn for receiving the portable antenna, said horn including an inner tube for insertion into said outer tube and an inverted pyramid that connects to said inner tube, said inner tube having at least three axially distributed inner holes; and
    a prong having two probes for inserting into said outer holes and two of said inner holes to secure said horn to said base; wherein
    said base, said horn and said prong are composed of three-dimensionally printable composite resin.

2. The pedestal according to claim 1, wherein said base and said horn are secured by an epoxy.

3. The pedestal according to claim 1, wherein said base secures to said ring by a plurality of bolts.

* * * * *